United States Patent
Kaushik et al.

(10) Patent No.: US 11,295,045 B2
(45) Date of Patent: Apr. 5, 2022

(54) TOOLS AND METHODS FOR AERODYNAMICALLY OPTIMIZING THE GEOMETRY OF VEHICLE BODIES

(71) Applicant: GM GLOBAL TECHNOLOGY OPERATIONS LLC, Detroit, MI (US)

(72) Inventors: Shailendra Kaushik, Novi, MI (US); Taeyoung Han, Bloomfield Hills, MI (US); Bahram Khalighi, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 375 days.

(21) Appl. No.: 16/374,049

(22) Filed: Apr. 3, 2019

(65) Prior Publication Data

US 2020/0320176 A1    Oct. 8, 2020

(51) Int. Cl.
| | |
|---|---|
| G06F 30/15 | (2020.01) |
| G06N 3/08 | (2006.01) |
| G01M 9/08 | (2006.01) |
| G06F 30/20 | (2020.01) |
| G06F 30/27 | (2020.01) |

(52) U.S. Cl.
CPC ............. *G06F 30/15* (2020.01); *G01M 9/08* (2013.01); *G06F 30/20* (2020.01); *G06F 30/27* (2020.01); *G06N 3/084* (2013.01)

(58) Field of Classification Search
CPC .......... G06F 30/15; G06F 30/20; G06F 30/27; G06F 2113/08; G06F 30/28; G06N 3/084; G06N 3/0481; G06N 3/0454; G01M 9/08; Y02T 90/00
See application file for complete search history.

(56) References Cited

U.S. PATENT DOCUMENTS

2018/0137417 A1* 5/2018 Theodorakopoulos ...................... G06N 3/0454
2021/0157962 A1* 5/2021 Baque ..................... G06F 30/17

FOREIGN PATENT DOCUMENTS

CN    108763718 A    * 11/2018

OTHER PUBLICATIONS

Guo, Xiaoxiao, Wei Li, and Francesco Iorio. "Convolutional neural networks for steady flow approximation." (ACM, 2016) In Proceedings of the 22nd ACM SIGKDD international conference on knowledge discovery and data mining, pp. 481-490. ISBN 978-1-4503-4232-2/16/08 (Year: 2016).*

(Continued)

*Primary Examiner* — Kibrom K Gebresilassie
(74) *Attorney, Agent, or Firm* — Lorenz & Kopf LLP

(57) ABSTRACT

Processor-implemented methods and systems for aerodynamically optimizing a design geometry of a vehicle body using a convolutional neural network (CNN) are provided. The method may include receiving a signed distance function (SDF) data file that represents the design geometry of the vehicle body. The method includes receiving a range of inflow boundary conditions. The processor processes the SDF over the range of boundary conditions, using the CNN, to generate therefrom drag and lift outputs for the design geometry. The drag and lift outputs may be displayed in the form of one or more intensity maps.

17 Claims, 5 Drawing Sheets

(56) References Cited

OTHER PUBLICATIONS

Yilmaz, Emre, and Brian German. "A convolutional neural network approach to training predictors for airfoil performance." (American Institute of Aeronautics and Astronautics, 2017) In 18th AIAA/ISSMO multidisciplinary analysis and optimization conference, p. 3660. DOI: 10.2514/6.2017-3660 (Year: 2017).*

Zhang, Yao, Woong Je Sung, and Dimitri N. Mavris. "Application of convolutional neural network to predict airfoil lift coefficient." (AIAA, 2018) In 2018 AIAA/ASCE/AHS/ASC Structures, Structural Dynamics, and Materials Conference, p. 1903. AIAA SciTech Forum Jan. 8-12, 2018 (Year: 2018).*

Venkatesan, Ragav, and Baoxin Li. Convolutional neural networks in visual computing: a concise guide. (CRC Press, 2018) pp. 19, 48-49, 71. ISBN 9781315154282 (Year: 2018).*

Eppler, Richard. Airfoil design and data. (Springer-Veriag Beriin Heidelberg, 1990) pp. 1-6. ISBN 978-3-662-02648-9 (Year: 1990).*

Anton Lundberg, Per Hamlin, and Davangere Shankar, "Automated Aerodynamic Vehicle Shape Optimization Using Neural Networks and Evolutionary Optimization" SAE international, 2015, pp. 242-251. (Year: 2015).*

Yao Zhang, WoongJe Sung "Application of Convolutional Neural Network to Predict Airfoil Lift Coefficient" pp. 1-8, 2018. (Year: 2018).*

X. Guo, W. Li, F. Lorio, "Convolutional Neural Networks for Steady Flow Approximation" pp. 481-490, 2016 (Year: 2016).*

* cited by examiner

US 11,295,045 B2

TOOLS AND METHODS FOR AERODYNAMICALLY OPTIMIZING THE GEOMETRY OF VEHICLE BODIES

TECHNICAL FIELD

The present disclosure generally relates to tools and methods for aerodynamically optimizing the geometry of vehicle bodies and more particularly, relates to tools and methods for real time modeling of changes in fluid flow around a vehicle body as a function of changes in the geometry of the vehicle body.

Currently, aerodynamically optimizing the geometry of a vehicle body is a long, expensive and unwieldy practice that generally requires multiple repetitions of an optimization process. A common clay model process begins with stylist envisioning a geometry of a vehicle body (i.e., a vehicle body shape) and utilizing a computer aided design (CAD) tool to define the geometry. The CAD tool converts the envisioned geometry into a data file. The data file is used by another tool to create a clay model of the envisioned geometry; the clay model may need to be further detailed by a user. The clay model is then subjected to wind tunnel testing to measure fluid flow variables, such as drag and lift, around the clay model. The drag and lift measurements associated with the envisioned geometry are reviewed by the stylist. Responsive to reviewing the drag and lift measurements, the stylist may define a change in the shape of the geometry; thus, a repetition of the clay model process is performed. As may be appreciated, aerodynamically optimizing the geometry of a vehicle body using the clay model process can take many days per cycle and be very expensive. The clay model process is also limited in that the wind tunnel testing results are static, they do not provide any predictive information that the stylist can use in the next cycle.

In a common simulation process, the sequence begins the same, and then the output of the CAD tool (the data file defining the vehicle body shape) is subjected to mathematical modeling and analysis by an aerodynamics engineer. In the simulation process, the data file is analyzed using computational fluid dynamics (CFD) to generate the drag and lift measurements. Responsive to reviewing the drag and lift measurements, the stylist may make a geometry change, thereby repeating operation, and the simulation process. In contrast to the clay modelling and wind tunnel approach, the CFD results can provide some insight into flow structure and forces experienced by the vehicle during operation. However, aerodynamically optimizing the geometry of a vehicle body using the simulation process also requires multiple repetitions of the sequential simulation process and can be very computationally and memory intensive.

Accordingly, technologically improved tools and methods that accelerate the aerodynamic optimization of the geometry of vehicle bodies are desired. The desired tools and methods model changes in fluid flow around a vehicle body as a function of changes in the geometry of the vehicle body. The desired tools and methods employ a convolution neural net (CNN) to provide near real-time fluid flow changes in terms of velocities, pressures, and forces (i.e., lift and drag). The following disclosure provides these technological enhancements, in addition to addressing related issues.

SUMMARY

In an embodiment, a processor-implemented method for modeling fluid flow around a design geometry of a vehicle is provided. The method includes: receiving, by a processor, the design geometry in a form of a signed distance function (SDF); receiving, by the processor, an inflow boundary condition and an associated range; and processing, by the processor, the SDF and the inflow boundary condition using a convolutional neural network (CNN) to generate fluid flow outputs for the design geometry across the range of inflow boundary conditions.

In one embodiment, the drag and lift outputs include tensors in the form of (i) an X velocity (X-vel), (ii) a Y velocity (Y-vel), and (iii) a pressure field (Prsr).

In one embodiment, further including, on a display system, displaying the drag and lift outputs as intensity maps.

In one embodiment, the CNN includes a plurality of hidden layers in a sequence.

In one embodiment, wherein each of the hidden layers include a rectified linear unit (ReLU) activation function and a MaxPooling layer.

In one embodiment, wherein the CNN includes a fully connected layer and the inflow boundary conditions are only inputs to the fully connected layer.

In one embodiment, wherein a first inflow boundary condition is a range of an angle of attack, and a second inflow boundary condition is a range of Reynolds numbers.

In one embodiment, wherein two or more hidden layers prior to the fully connected layer perform an encoder functionality and two or more hidden layers after the fully connected layer perform a decoder functionality.

In one embodiment, wherein the CNN is trained using a training data set of multiple geometric shapes.

In one embodiment, wherein the CNN is trained using a validation data set having the same geometric shapes as the training data set.

In one embodiment, wherein one pass over the training data set is called an epoch, in each epoch, a training error is generated, and wherein the CNN is trained by comparing the training error to a threshold and backpropagating when the training error exceeds the threshold.

In one embodiment, wherein the backpropagating includes adjusting weights in neurons of an encoder based on a comparison of the training error to its previous value.

In another exemplary embodiment, a system for modeling fluid flow for a design geometry of a vehicle, is provided. The system includes: a processor programmed to receive inflow boundary conditions and the design geometry of the vehicle, the design geometry being in the form of a signed distance function (SDF); a storage media having stored therein a convolutional neural network (CNN) that, when executed by the processor, processes the SDF and the inflow boundary conditions to thereby generate real-time drag and lift outputs; and a display system configured to display the drag and lift outputs in the form of intensity maps.

In an embodiment, wherein the source of inflow boundary conditions also provides a range of Reynolds numbers.

In an embodiment, wherein the CNN is trained using a training data set of multiple geometric shapes.

In an embodiment, wherein the CNN is trained using a validation data set having the same geometric shapes as the training data set.

In an embodiment, wherein the CNN is trained by comparing a training error to a threshold and backpropagating when the training error exceeds the threshold.

In another exemplary embodiment, a method for providing lift and drag feedback for a design geometry of a vehicle body is provided. The method includes: receiving, by a processor, a signed distance function (SDF) generated from the design geometry of the vehicle body; receiving a range or angles of attack; receiving a range of Reynolds numbers; and processing, by the processor, the SDF, the range of angles of attack, and the range of Reynolds numbers, using a convolutional neural net (CNN), to generate therefrom the drag and lift feedback for the design geometry.

In an embodiment, further including, on a display system, displaying the drag and lift feedback using a visualization technique to indicate intensities.

In an embodiment, wherein the CNN includes a plurality of hidden layers in a sequence, and the sequence includes: two or more convolution hidden layers, one fully connected layer, and two or more deconvolution layers.

BRIEF DESCRIPTION OF THE DRAWINGS

Aspects of the present disclosure are best understood from the following detailed description when read with the accompanying figures, wherein like numerals denote like elements, and.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. Accordingly, it should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

For the purpose of the description, various functional blocks and their associated processing steps may be referred to as a module. As used herein, each "module" may be implemented in any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

As mentioned, aerodynamically optimizing the geometry of a vehicle body using conventional tools and methods is generally a long, expensive, and unwieldy practice. Two common optimization processes are technologically challenged by (1) multiple repetitions of lengthy operations, and (2) limited utility of the drag and lift output. The common optimization processes are additionally challenged because there are competing forces at sequential steps of a cycle. I.e., optimization from the stylist's perspective is generally driven by aesthetics, and optimization from the aerodynamics engineer's perspective is driven by aerodynamic performance. Accordingly, and with reference to FIGS. 1-2, the provided exemplary embodiments of tools (FIG. 1, system 102) and methods (FIG. 2, method 200) and for aerodynamically optimizing the geometry of vehicle bodies address the above-mentioned technological challenges and enable the stylist and aerodynamics engineer to work concurrently rather than in sequence.

Figure 1:
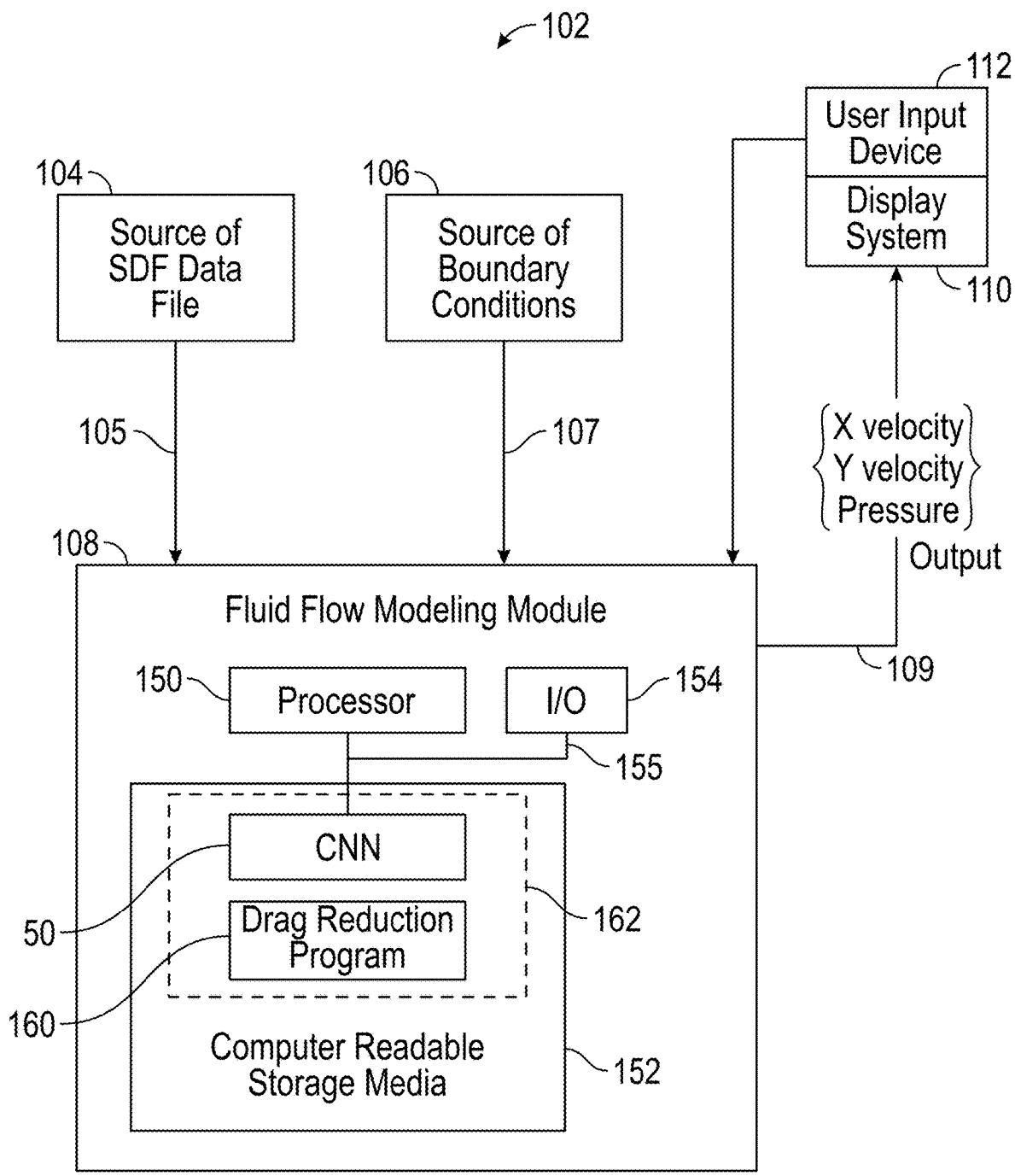
FIG. 1 is a block diagram of a fluid flow modeling system for optimizing the geometry of vehicle bodies, in accordance with some embodiments.
Figure 2:
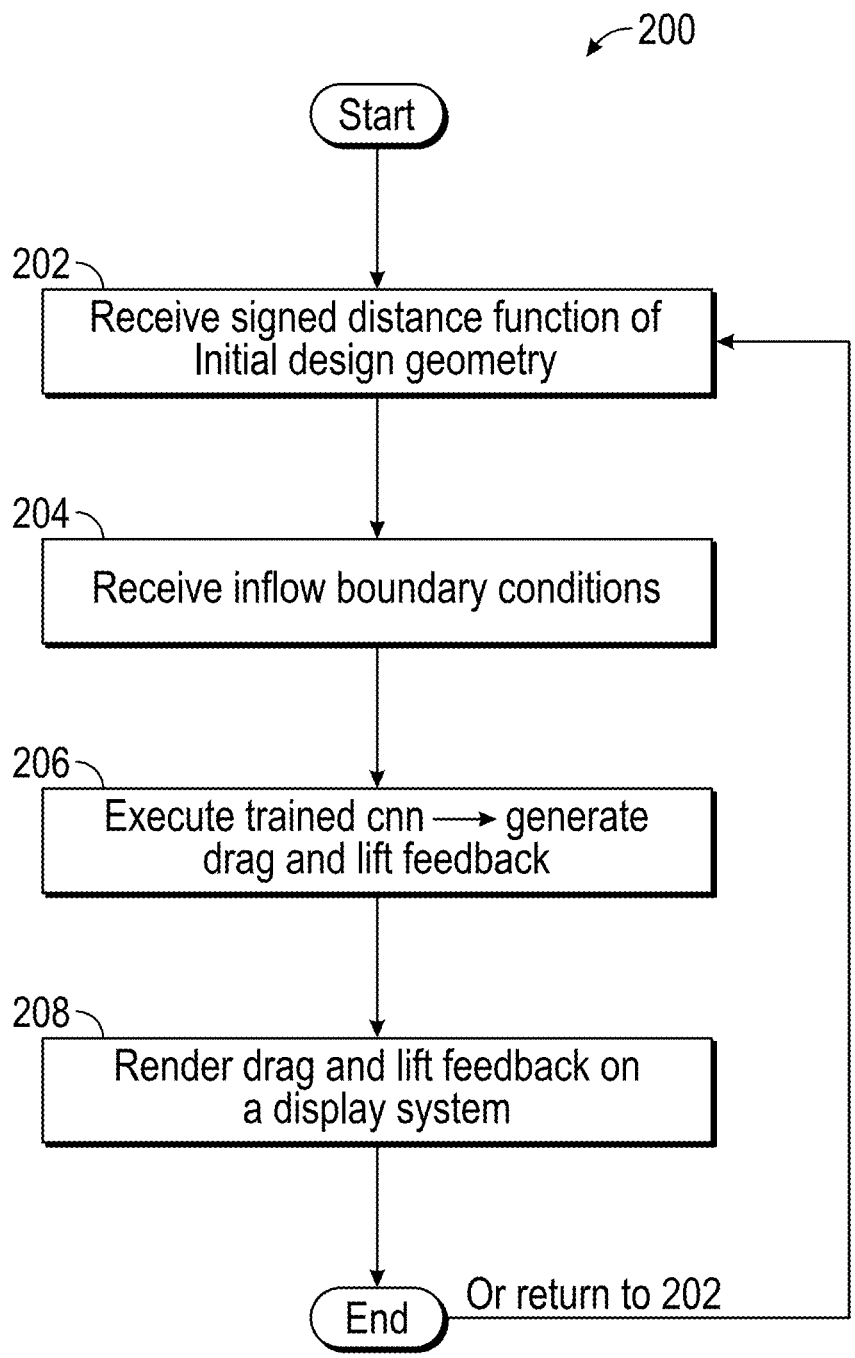
FIG. 2 is an illustration depicting a method for aerodynamically optimizing the geometry of vehicle bodies, in accordance with various embodiments.

FIG. 2 depicts a technologically improved method 200 for modeling fluid flow, in accordance with various exemplary embodiments. For illustrative purposes, the following description of method 200 may refer to elements mentioned in connection with FIG. 1. In practice, portions of method 200 may be performed by different components of the described system 102. It should be appreciated that method 200 may include any number of additional or alternative tasks, the tasks shown in FIG. 2 need not be performed in the illustrated order, and one or more of the tasks shown in FIG. 2 could be omitted from an embodiment of the method 200 if the intended overall functionality remains intact. Moreover, method 200 may be incorporated into a more comprehensive procedure or method having additional functionality not described in detail herein.

At operation 202, a signed distance function (SDF) data file, SDF 105, is received from a source 104 of a signed distance function. In various embodiments, the SDF 105 is received from a computer aided design (CAD) tool. In various embodiments, the SDF 105 is a tensor. In various three-dimensional embodiments, the SDF 105 is a three-dimensional image: two of the dimensions representing a two-dimensional pixelated area, like a flat "picture," and the third dimension providing an intensity at each pixel. In various embodiments, the SDF 105 is a 150×150 array.

Regardless of the size and configuration of the SDF 105, it is the input data file for the fluid flow modeling module 108, and it represents a design geometry for which the drag and lift measurements are desired. In a first iteration of the method 200, the first SDF 105 received is based on an initial design geometry. The initial design geometry may be two dimensional or three-dimensional. In an example, the initial design geometry is a vehicle body. As mentioned, in various embodiments, a CAD tool is used to define the initial design geometry, converting a design geometry concept into a design geometry data file which is then converted into the SDF 105. In subsequent passes through method 200, the subsequent SDF 105 inputs may represent shape/geometry modifications to the initial design geometry.

At 204, one or more inflow boundary conditions 107 are received. Each of the one or more inflow boundary conditions 107 may have an associated range. For example, an inflow boundary condition may be an angle of attack, and its range may be zero to 20 degrees. In various embodiments, the inflow boundary conditions 107 comprise a range of Reynolds numbers "Re" and a range of angles of attack "AoA."

At operation 206, the trained CNN 50 is executed, and the fluid flow modeling module 108 models fluid flow around the design geometry to thereby generate real-time drag and lift output measurements 109 for the design geometry. The drag and lift outputs in the form of fluid flow output 109 from fluid flow modeling module 50 are inclusive of drag and lift measurements as the boundary conditions 107 are varied across respective ranges; therefore, the drag and lift outputs 107 are tensors in the form of an X velocity (X-vel), a Y velocity (Y-vel), and a pressure field (Prsr). In various embodiments, the outputs 109 may be displayed (at 208) on a display system 110, in the form of one or more intensity maps or "heat maps." In various embodiments, the intensity maps may be displayed using colors or in a grey scale. Non-limiting examples of a source 106 of inflow boundary conditions 107 include a user input device 112, a computer readable storage 152, or a database.

With continued reference to FIG. 1, the fluid flow modeling module 108 is described in more detail. In various embodiments, the fluid flow modeling module 108 includes at least one processor 150 and a computer-readable storage device or media 152. The processor, when executing the program 160 and CNN 50, is programmed to receive inflow boundary conditions 107 and the design geometry of the vehicle, the design geometry being in the form of a signed distance function (SDF) 105, and to generate lift and drag feedback 109 therefrom.

The processor 150 may be one or more of: a custom-made or commercially available processor, a central processing unit (CPU), a graphics processing unit (GPU), an application specific integrated circuit (ASIC) (e.g., a custom ASIC implementing a neural network), a field programmable gate array (FPGA), a semiconductor-based microprocessor (in the form of a microchip or chip set), any combination thereof, or generally any device for executing instructions. Although only one processor 150 is shown in FIG. 1, in various embodiments of the fluid flow modeling module 108, the processor 150 functionality may be distributed among any number of processors 150, each communicating over a communication bus 155 via an I/O system 154, or any other suitable communication medium or combination of communication mediums. In these embodiments the one or more distributed processors 150 cooperate in the processing of the SDF 105, the performance of the logic, calculations, methods and/or algorithms for controlling the components of the fluid flow modeling system 102 operation as described herein.

The computer-readable storage device or media 152 may include volatile and nonvolatile storage in read-only memory (ROM), random-access memory (RAM), and keep-alive memory (KAM), for example. KAM is a persistent or non-volatile memory that may be used to store various operating variables while the processor 150 is powered down. The computer-readable storage device or media 152 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, such as drag reduction program 160 and CNN 50.

One or more separate programs, and specifically, a drag reduction program 160 and CNN 60, may also be stored in the computer-readable storage device or media 152. The drag reduction program 160 includes an ordered listing of executable instructions and associated preprogrammed variables for implementing the logical functions, operations, and tasks of the disclosed fluid flow modeling system 102 that employs a convolutional neural network (CNN 50) to generate real-time drag and shape change feedback in the form of fluid flow outputs 109. The drag reduction program 160 and CNN 60, when executed by the processor 150, cause the processor 350 to the perform logic, calculations, methods and/or algorithms described herein for generating the drag and lift outputs 107. The CNN 60 may be implemented in various ways; a detailed description of an exemplary embodiment of a CNN 60 is described in connection with FIG. 3.

Those skilled in the art will recognize that the algorithms and instructions of the present disclosure are capable of being distributed as a program product 162. As a program product 162, one or more types of non-transitory computer-readable signal bearing media may be used to store and distribute the drag reduction program 160 and CNN 60, such as a non-transitory computer readable medium bearing the drag reduction program 160 and CNN 60, and containing therein additional computer instructions for causing a computer processor (such as the processor 150) to load and execute the drag reduction program 160 and CNN 60. Such a program product 162 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that, in various embodiments, cloud-based storage and/or other techniques may also be utilized as storage media 152 and provide time-based performance of drag reduction program 160 and CNN 60.

In various embodiments, the I/O system 154 is configured to incorporate an input/output device, and to support instantaneous (i.e., real time or current) communications between the processor 150 and one or more external data source(s), such as the source 104 of the SDF data file and the source 106 of boundary conditions, an output apparatus, such as a display system 110, and a user input device 112. The I/O system 154 may incorporate one or more transmitters, receivers, and the supporting communications hardware and software required for components of the fluid flow modeling module 108 to communicate as described herein. Also, in various embodiments, the I/O system 154 may support communication with technicians, and/or one or more storage interfaces for direct connection to external storage apparatuses.

Figure 3:
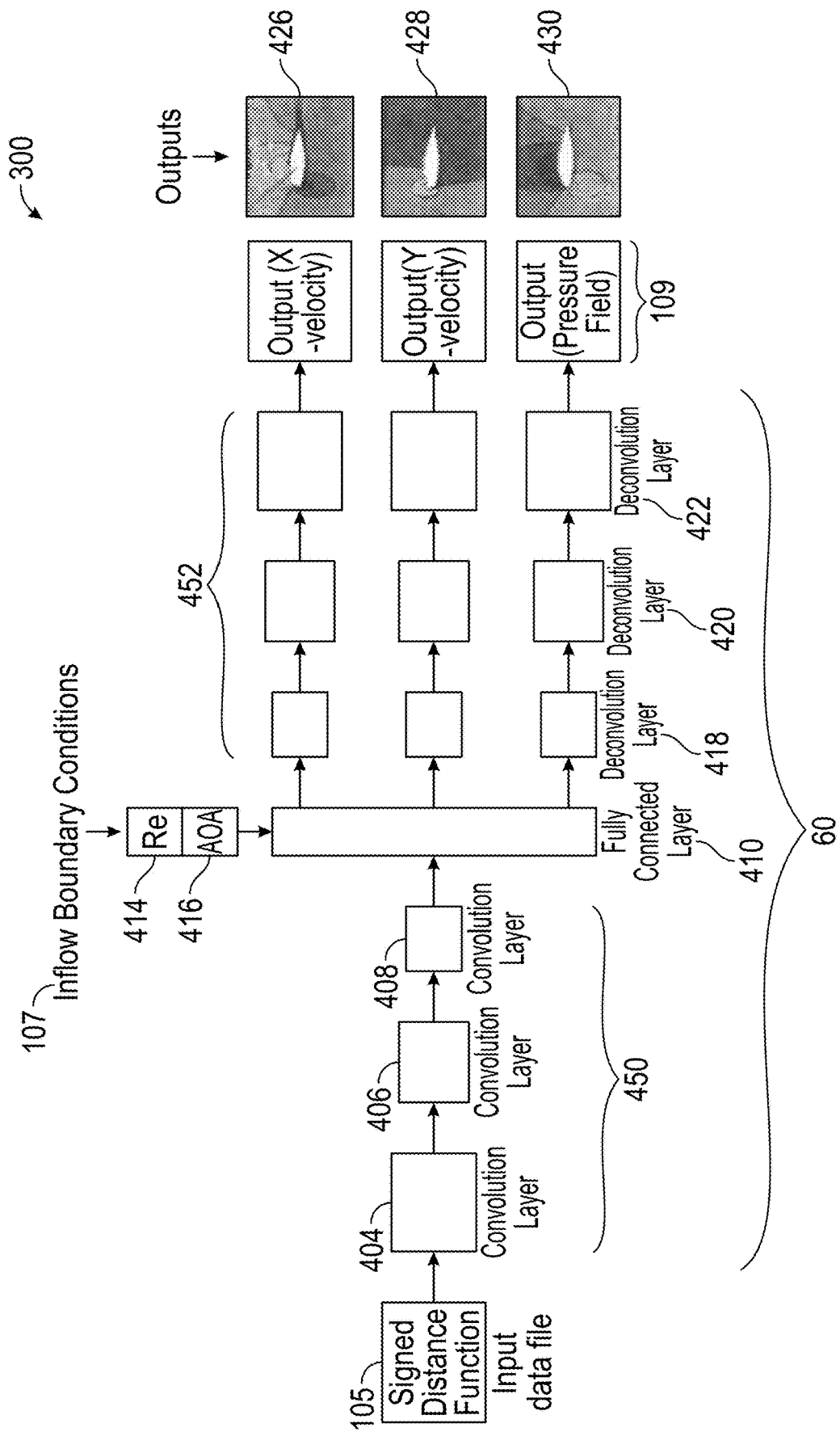
FIG. 3 is a diagram indicating the arrangement of the layers of a CNN, in accordance with some embodiments.

Turning now to FIG. 3, and with continued reference to FIGS. 1-2, in embodiments 300 of the example fluid flow modeling module 108 the processor 150 harnesses the power of artificial intelligence (AI) and machine learning (ML), specifically by implementing a convolutional neural network (CNN) 60 with multiple hidden convolution layers. The CNN 60, once trained, advantageously combines the strengths of CFD and wind-tunnel testing by providing near real-time modeling and feedback related to changes in fluid flow around a vehicle body. The feedback indicates the impact of shape and inflow conditions on drag and lift for the design geometry. The CNN 60 saves computational time, reduces cycle time, and provides high utility real-time feedback on drag and shape changes for use in aerodynamically optimizing the geometry of vehicle bodies.

The input layer 105 of the CNN 60 receives the input data file, SDF 105. The CNN 60 is comprised of N hidden layers (referred to herein as Hn). In various embodiments, N ranges from 3 to more than 30. In the example CNN 60, there are 7 hidden layers (H7) in sequence. The hidden layers include two or more convolution hidden layers arranged in a sequence (referencing H1 404, H2 406, and H3 408) to form an encoder section. H1 404 operates on the input layer 402, H2 406 operates on H1 404, and H3 408 operates on H2 406.

The hidden layers include one fully connected layer 410 at approximately midway through the sequence of hidden layers $H_n$; the fully connected layer 410 configured to operate on the output of the encoder section 450 (i.e., the output of $H_3$ 408) using the inflow boundary conditions 107. Specifically, the inflow boundary conditions 107 are only inputs to the fully connected layer 410, i.e., they are not input to the other hidden layers. In various embodiments, the inflow boundary conditions 107 comprise a range of Reynolds numbers 414 "Re" and a range of angles of attack 416 "AoA." The fully connected layer 410 (also referred to as a dense layer) is used for classification: it receives a two- or three-dimensional input and converts it into three fluid flow outputs: X velocity information (X-vel), Y velocity information (Y-vel), and pressure field information (Prsr).

The hidden layers further include two or more de-convolution hidden layers arranged in a sequence to form a decoder section 452 (referencing $H_4$ 418, $H_5$ 420, and $H_6$ 422). The decoder section 452 operates on the output of the fully connected layer 410 (i.e., $H_4$ 418 operates on 410, $H_5$ 420 operates on $H_4$ 418, and $H_6$ 422 operates on $H_5$ 420). However, in the decoder section, the three outputs from the fully connected layer 410 (X velocity information, Y velocity information, and pressure field information) remain separate from each other in the processing of the decoder section. In other words: $H_4$ 418 has distinct components for X velocity information, Y velocity information, and pressure field information; $H_5$ 420 has distinct components for X velocity information, Y velocity information, and pressure field information; and $H_6$ 422 has distinct components for X velocity information, Y velocity information, and pressure field information.

In accordance with CNN methodology, in each of the N hidden layers, a neuron or filter is chosen (a design choice) for the convolution of the input layer to thereby generate the subsequent layer. The neuron or filter has "field dimensions," and the application and the field dimensions affect the number and magnitude of weights, which are multipliers, associated with inputs to each neuron. The weights are set to an initial value, adjusted during the training process of the CNN 60, and continue to adjust during operation of the CNN 60. The dimensions of each hidden layer $H_n$ are a function of the layer it operates on and the operations performed. In an embodiment, the SDF 105 input layer is a two-dimensional tensor of dimensions 150×150. Moving from each hidden layer $H_n$ to a subsequent hidden layer $H_n$, design choices continue to inform the selection of subsequent neurons, respective weights, and operations.

Once a layer has been convolved or deconvolved, an activation function is used to give the output of the hidden layer $H_n$ its non-linear properties. The activation function is a design and task specific choice. In various embodiments of the CNN 60, a rectified linear unit (ReLU) activation function is chosen for the hidden layers because it produces the best performance in the CNN 60 and provides a computationally simple thresholding of values less than zero.

Figure 4:
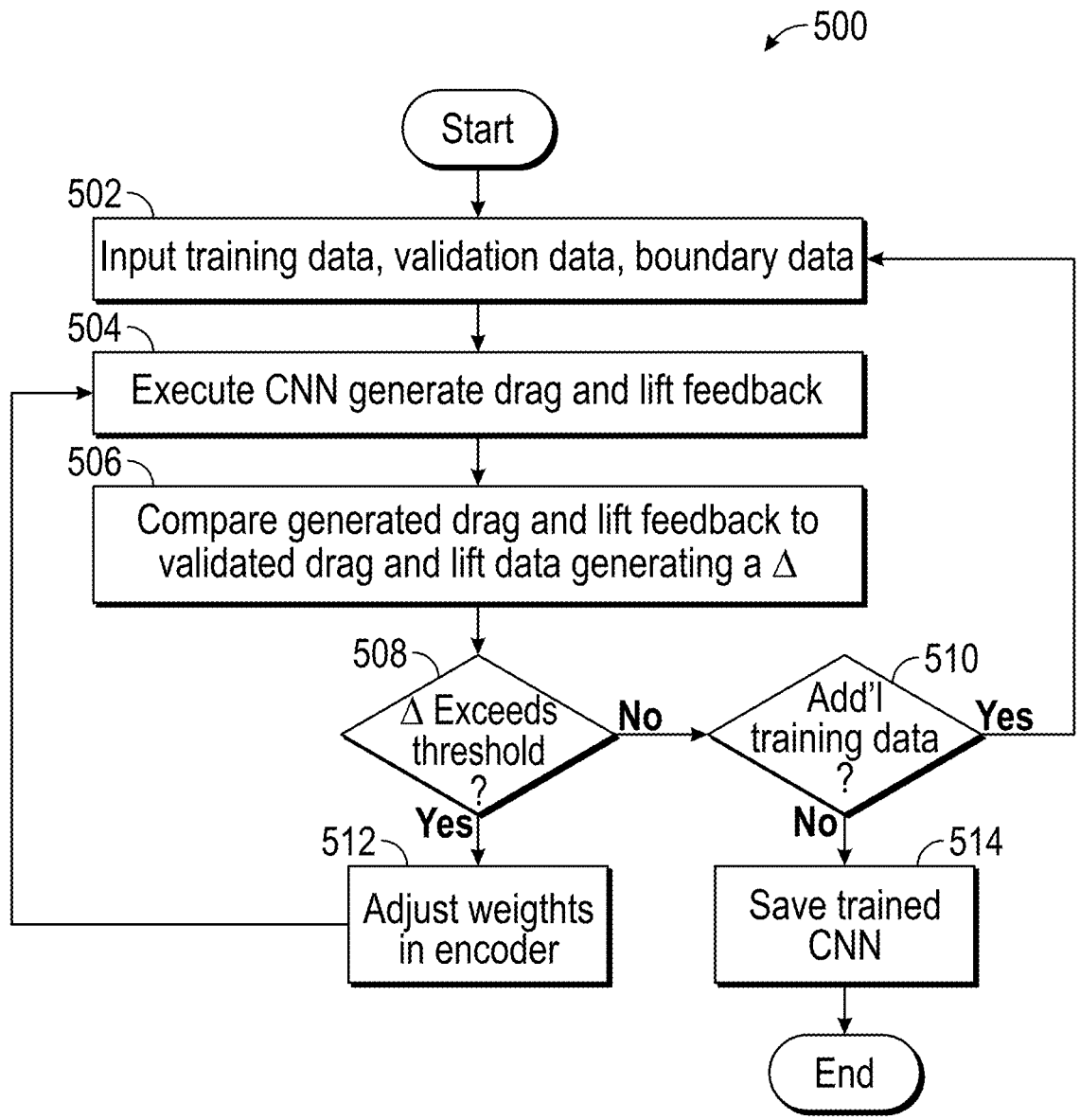
FIG. 4 is an example method for training the CNN, in accordance with some embodiments.

Also, in accordance with CNN methodology, other hidden layers and operations may be interspersed between the convolution hidden layers. In the example of FIG. 4, each of the hidden layers Hn is actually {convolution and ReLu and Max Pooling}. Max Pooling is a down-sampling methodology, in that it is used to reduce the number of parameters and/or spatial size of the layer it is applied to.

The CNN 60 executes by processing the input SDF across the boundary conditions (e.g., the range of angles of attack and the range of Reynolds numbers), to generate therefrom drag and lift feedback in the form of fluid flow outputs 109 for the design geometry. The drag and lift outputs 424 are available nearly real-time and include tensors in the form of: An X velocity information file (X-vel), a Y velocity information file (Y-vel), and a pressure field information (Prsr) file. The outputs of the CNN 60 may be displayed as images on a display system 110. In some embodiments, one or more of the output files X-vel, Y-vel, and Prsr are rendered as graphs. In some embodiments, heat-map images are generated for each of the output files X-vel, Y-vel, and Prsr: the initial design geometry 425 may be rendered, roughly in the center of the image, and the respective fluid flow information may be depicted around the initial design geometry using a visualization technique to indicate intensities. In an embodiment, the visualization technique is grey scale. In another embodiment, the visualization technique is color mapping. For example, using an airfoil initial design geometry as the input data file 105, intensity map 426 displays the X-vel intensity information rendered around it using shades of grey; intensity map 428 displays the Y-vel intensity information rendered around it using shades of grey; and, intensity map 430 displays the Prsr intensity information rendered around it using shades of grey.

Turning now to FIG. 4, a process flow chart depicting an example process 500 for training the CNN 60 for use in aerodynamically optimizing the geometry of vehicle bodies is shown. Due to the nature of the CNN 60, training the CNN 60 is interchangeable with configuring the CNN 60 by a processor 150 or by a processing system. The example CNN 60 is trained using a backpropagation method to adjust weights on individual neurons in the encoder 450 section.

Training the CNN 60 involves using a training data set and a validation data set. The members of the training data set comprise multiple geometric shapes, each shape in the form of a SDF data file. Training data may also include the boundary values and ranges to be used. The validation data set also comprises the same members of the training data set (i.e., the same multiple geometric shapes, each shape in the form of a SDF data file, and the same boundary values and ranges); plus, the validation data set has, for each shape, the valid, or actual, lift and drag data. Training the CNN 60 comprises, at 502, retrieving or receiving the training data set, boundary values and ranges, and retrieving or receiving the validation data set.

At 504, the CNN 60 is executed for a member of the training data set, and the CNN 60 generates drag and lift feedback. At 506, the generated drag and lift feedback is compared to the known valid drag and lift feedback for the member of the training data set to thereby generate a delta. The delta is a training error, and it is compared to an error threshold at 508, and if it exceeds the threshold at 508, the weights in the neurons of the encoder 450 are adjusted (at 512), and the method returns to 504 to execute the CNN 60 again. If the training error is acceptable, i.e., the delta is below the threshold at 508, the method moves to operation 510 to determine whether there is another member of the training data set to process. One pass over the training data set is called an epoch. In each epoch, a training error is generated, for example, as a cyclic piecewise linear loss function, and the weights in the neurons of the encoder 450 may be adjusted, in part, based on a comparison of the training error to its previous value, which is referred to as a test error.

The CNN 60 is trained using the entire training data set, one entry at a time, in random order, as the inflow boundary conditions are varied, to generate/predict the drag and lift outputs. In each pass over the data set, a prediction is compared to a known value (i.e., using the validation data) to create the delta described above. The number of epochs used for training is generally a function of the size of the training data set and the complexity of the task. As applied to the CNN 60, the number of epochs is related to the number of hidden layers, and the number of epochs is determined by continuing to increase it while the training error and the test error are decreasing together. Once the test errors stabilize, no further epochs are performed; any further epochs are expected to cause overfitting.

Once trained, the CNN 60 is saved in a storage media, such as storage media 152, at 514. The trained CNN 60 is configured to process the SDF 105 over the inflow boundary conditions to generate (i.e., predict) respective outputs 107 as described herein. It is understood that once trained, the CNN 60 may continue to be trained while being executed in an actual application.

Figure 5:
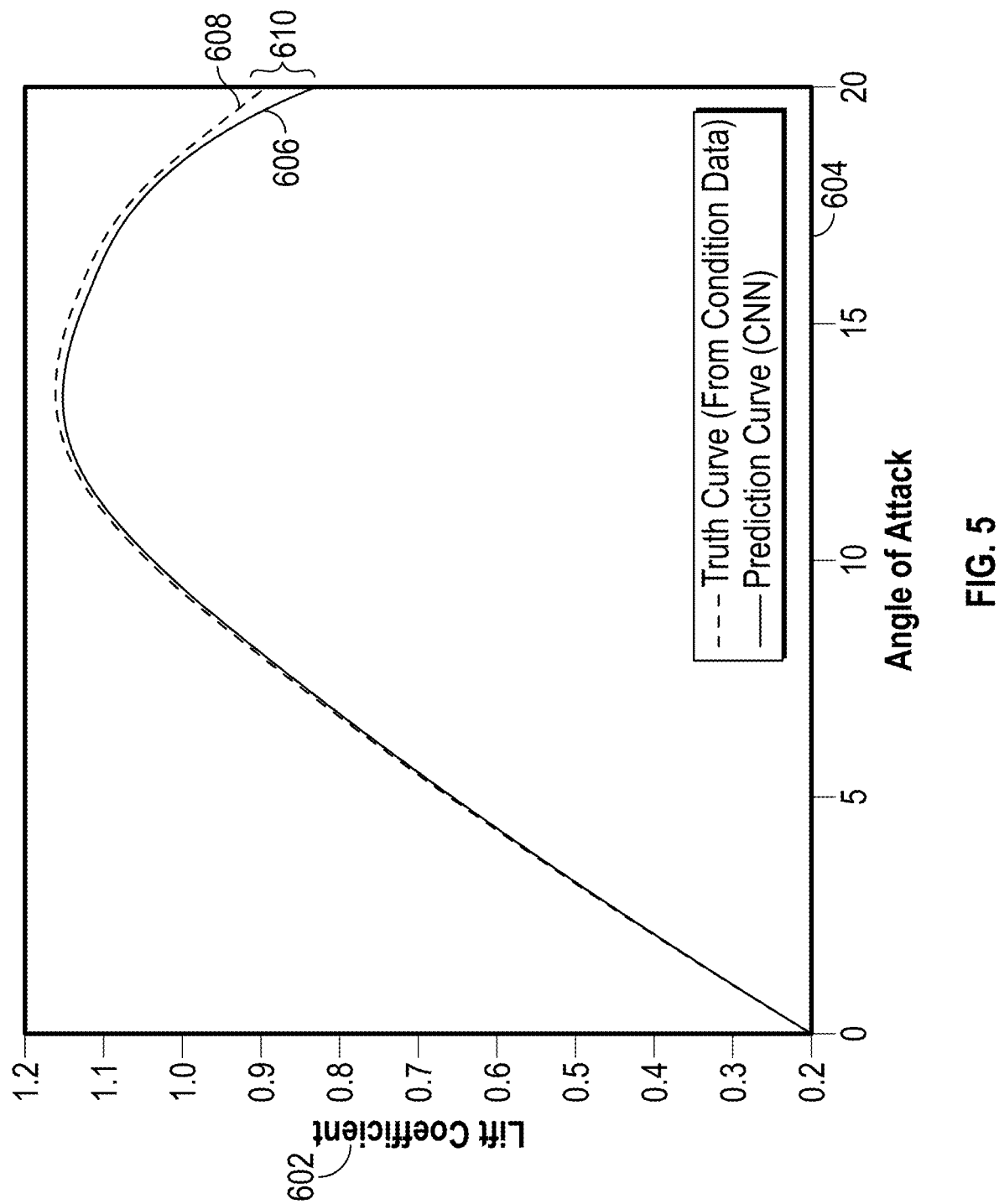
FIG. 5 is a graph showing a highly accurate prediction curve of lift across a range of angles of attack, as provided by an exemplary embodiment.

Turning now to FIG. 5, the accuracy the CNN 60 is capable of is described. In this embodiment, a trained CNN 60 was used to predict a lift coefficient 602 as a function of a wide range of angles of attack on the X axis 604 for three different two-dimensional airfoils. In each case, the SDF input layer 105 had dimensions 150×150; 21 AoAs 416 were used (0-20); and, four Res 414 were used (0.5×10e6, 1.0× 10e6, 3.0×10e6, and 5.0×10e6), generating 252 simulations. This example resulted in highly accurate lift and drag feedback in the form of fluid flow outputs 109. FIG. 5 shows, a graph of a lift coefficient 602 on the Y axis as a function of the AoA on the X axis 604 is shown. The curve of data predicted by the CNN 60 (line 608) tracks closely with the curve of validation data 606, only deviating (610) at very high angles of attack (approximately 19.5 degrees in the example).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A processor-implemented method for aerodynamically optimizing a design geometry of a vehicle by providing real-time feedback showing an impact of the design geometry and inflow boundary conditions on fluid flow around the design geometry of the vehicle, the method comprising:
    receiving, by a processor, the design geometry in a form of a signed distance function (SDF);
    receiving, by the processor, a range of inflow boundary conditions to apply to the design geometry, the range of inflow boundary conditions comprising a range of angles of attack; and
    processing the design geometry across the range of the inflow boundary conditions to convert, by the processor, the SDF into three distinct fluid flow outputs, comprising X velocity information (X-vel), Y velocity information (Y-vel), and pressure field information (Prsr), converting performed by the processor applying the SDF as an input to an encoder section of a convolutional neural network (CNN), applying the range of inflow boundary conditions only to a fully connected layer of the CNN, the CNN being configured to generate each of the three distinct fluid flow outputs from the fully connected layer inclusive of varying inflow boundary conditions across the range of inflow boundary conditions, and to employ a decoder section that separately operates on each of the three distinct fluid flow outputs.

2. The method of claim 1, wherein the inflow boundary conditions further comprise a range of Reynold's numbers and the three fluid flow outputs are tensor measurements that drag and lift are proportionate to.

3. The method of claim 1, further comprising, on a display system, displaying the three distinct fluid flow outputs as separate intensity maps.

4. The method of claim 3, wherein the CNN comprises a plurality of hidden layers in a sequence.

5. The method of claim 4, wherein each of the hidden layers include a rectified linear unit (ReLU) activation function and a MaxPooling layer.

6. The method of claim 1, wherein the CNN is trained using a training data set of multiple geometric shapes.

7. The method of claim 6, wherein the CNN is trained using a validation data set having the same geometric shapes as the training data set.

8. The method of claim 7, wherein one pass over the training data set is called an epoch, in each epoch, a training error is generated, and wherein the CNN is trained by comparing the training error to a threshold and backpropagating when the training error exceeds the threshold.

9. The method of claim 8, wherein the backpropagating includes adjusting weights in neurons of an encoder based on a comparison of the training error to its previous value.

10. A system for aerodynamically optimizing a design geometry of a vehicle by providing real-time feedback showing an impact of the design geometry and inflow boundary conditions on fluid flow for the design geometry of the vehicle, the system comprising:
    a storage media having stored therein a trained convolutional neural network (CNN);
    a processor operationally coupled to the storage media and programmed to:
    receive a range of inflow boundary conditions comprising a range of angles of attack;
    receive the design geometry of the vehicle, the design geometry being in the form of a signed distance function (SDF);
    process the design geometry across the range of the inflow boundary conditions by converting, by the processor, the SDF into three distinct fluid flow outputs comprising X velocity information (X-vel), Y velocity information (Y-vel), and pressure field information (Prsr), the converting performed by the processor applying the SDF as an input to an encoder section of a convolutional neural network (CNN), applying the range of inflow boundary conditions only to a fully connected layer of the CNN, the CNN being configured to generate each of the three distinct fluid flow outputs from the fully connected layer inclusive of boundary conditions being varied across the range of inflow boundary conditions, and to employ a decoder section that separately operates on each of the three distinct fluid flow outputs; and
    a display system configured to display the three distinct fluid flow outputs for the design geometry of the vehicle in the form of intensity maps.

11. The system of claim 10, wherein the inflow boundary conditions also include a range of Reynolds numbers.

12. The system of claim 11, wherein the CNN is trained using a training data set of multiple geometric shapes.

13. The system of claim 12, wherein the CNN is trained using a validation data set having the same geometric shapes as the training data set.

14. The system of claim 13, wherein the CNN is trained by comparing a training error to a threshold and backpropagating when the training error exceeds the threshold.

15. A method for providing real-time lift and drag feedback for a design geometry of a vehicle body by showing an impact of design geometry and inflow boundary conditions on fluid flow around the design geometry, the method comprising:

receiving, by a processor, a signed distance function (SDF) generated from the design geometry of the vehicle body;

receiving a range of angles of attack;

receiving a range of Reynolds numbers; and converting the SDF into three distinct fluid flow outputs comprising X velocity information (X-vel), Y velocity information (Y-vel), and pressure field information (Prsr), the converting performed by the processor applying the SDF as an input to an encoder section of a convolutional neural network (CNN), applying the range of angles of attack and the range of Reynolds numbers only to a fully connected layer of the CNN, the CNN being configured to generate each of the three distinct fluid flow outputs from the fully connected layer inclusive of boundary conditions being varied across the range of angles of attack and across the range of Reynold's numbers, and to employ a decoder section that separately operates on each of the three distinct fluid flow outputs.

16. The method of claim 15, further comprising, on a display system, displaying the X-vel, Y-vel, and Prsr using a visualization technique to indicate respective intensities.

17. The method of claim 16, wherein the CNN comprises a plurality of hidden layers in a sequence, the sequence includes: two or more convolution layers, one fully connected layer, and two or more deconvolution layers.

* * * * *